US007008579B2

(12) United States Patent
Edler et al.

(10) Patent No.: US 7,008,579 B2
(45) Date of Patent: Mar. 7, 2006

(54) METHOD AND INSTALLATION FOR PROCESSING THERMOPLASTIC SYNTHETIC MATERIALS

(75) Inventors: Gerhard Edler, Trebur (DE); Hans-Joachim Keim, Stuttgart (DE)

(73) Assignee: Merck Patent GmbH, Darmstadt (DE)

(*) Notice: Subject to any disclaimer, the term of this patent is extended or adjusted under 35 U.S.C. 154(b) by 217 days.

(21) Appl. No.: 10/399,966

(22) PCT Filed: Oct. 23, 2001

(86) PCT No.: PCT/EP01/12211

§ 371 (c)(1), (2), (4) Date: Apr. 23, 2003

(87) PCT Pub. No.: WO02/34495

PCT Pub. Date: May 2, 2002

(65) Prior Publication Data

US 2004/0094872 A1 May 20, 2004

(30) Foreign Application Priority Data

Oct. 24, 2000 (DE) ................................ 100 52 841

(51) Int. Cl.
*B28B 1/08* (2006.01)
*C04B 33/32* (2006.01)

(52) U.S. Cl. ........................... 264/69; 264/70; 264/645

(58) Field of Classification Search ................ 264/123, 264/241, 248, 263, 280, 69, 70, 645
See application file for complete search history.

(56) References Cited

U.S. PATENT DOCUMENTS

| | | | |
|---|---|---|---|
| 4,170,103 A * | 10/1979 | Norris et al. | 57/293 |
| 5,538,413 A | 7/1996 | Gardner et al. | |
| 5,556,582 A | 9/1996 | Kazmer | |
| 5,766,654 A | 6/1998 | Groleau | |

FOREIGN PATENT DOCUMENTS

| | | |
|---|---|---|
| DE | 101 03 821 | 8/2001 |
| EP | 0 339 184 | 11/1989 |
| EP | 0 362 648 | 4/1990 |
| EP | 0 442 255 | 8/1991 |
| EP | 0 508 732 | 10/1992 |
| EP | 0 573 232 | 12/1993 |
| JP | 06 285911 | 10/1994 |

* cited by examiner

*Primary Examiner*—Stephen J. Lechert, Jr.
(74) *Attorney, Agent, or Firm*—Millen, White, Zelano, Branigan, P.C.

(57) ABSTRACT

The invention relates to a method and an installation for processing thermoplastic synthetic materials. According to the invention, the melt strands or the like are displaced in oscillation or pulsation in order to indent or penetrate the joint lines between at least two injection strands.

15 Claims, 1 Drawing Sheet

METHOD AND INSTALLATION FOR PROCESSING THERMOPLASTIC SYNTHETIC MATERIALS

PRIOR ART

Figure 1:
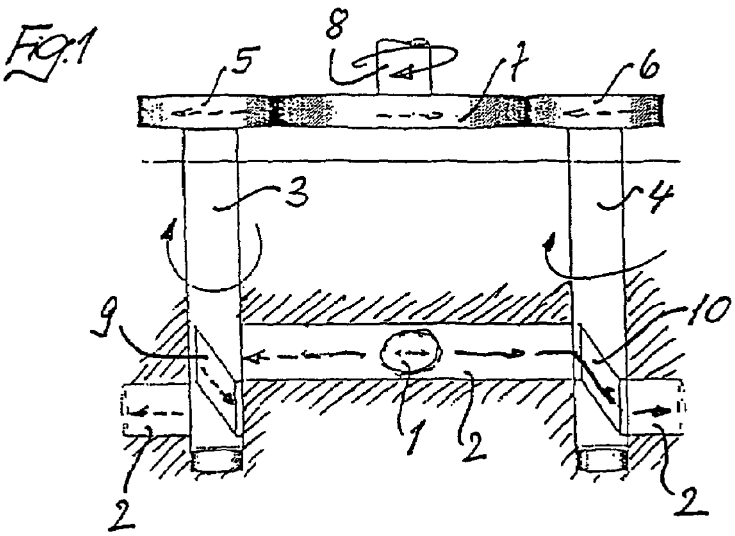

The invention is based on a process and unit for the processing of thermoplastics according to the pre-characterising part of the main claim and of sub-claim 11 respectively. A wide variety of processes of this type and corresponding processing units are known, for example for the injection moulding of thermoplastics. However, the melt can also be processed by extrusion or other methods instead of by injection moulding. The crucial factor for the invention is that the processing causes the formation of a flow line at the point where two melt strands or the like meet and bond to one another, so long as the melt enables this owing to an adequate temperature. The bonding of plastic strands forced into a mould via a plurality of nozzles basically represents a problem for firstly the mutual bonding of the strands and secondly for the actually filling of the injection mould. Thus, it is known to avoid such disadvantages by subsequent pressing of the plastic that has already been injected (DE-A 3717609). However, it has been found in practice that although improvements can be achieved by increasing the pressure, the problem as such has not been solved.

The problem in all these known processes and a drawback in the known processing units is that weak points, both visually and with respect to strength, may remain on the final product at the joint points of the melt strands or the points of contact, namely at the flow lines. A visual disadvantage arises in particular if the melts are provided with fillers or pigments. In spite of good mixing of the materials, the flow and in particular separation of the melt streams causes the formation of irregularities and dealignment of the polymer molecules and the pigments, which are then clearly evident as a flow line, namely as the point of contact of the strands. On corresponding loading, fracture points form, preferentially in these flow lines, where the weakening of the product owing to the flow lines can, depending on the processing method, amount to as much as 60% of the actual material strength given correct processing, i.e. adequate melt temperature at the joint points.

THE INVENTION AND ITS ADVANTAGES

By contrast, the process according to the invention and the processing unit according to the invention for the processing of meltable materials, such as thermoplastics or the like, having the characterising features of the main claim and of sub-claim 11 respectively has the advantage that, owing to the relative movement of the two melt strands in contact with one another as a result of vibration or pulsing, deeper penetration of the melts into one another at these flow lines takes place, causing firstly the flow lines to become less visible or disappear completely in visual terms, and secondly causing a considerable improvement in the strength in the flow line region. Owing to the material set in vibration, the molecules of the melts of the strands facing one another engage and hook into one another, forming an intimate bond.

Although it is known to set elastomer compositions into high-frequency vibration in order thus to achieve better flow behaviour (DE-A 19830296), this is not, however, accomplished using a vibration treatment of this type in the sense according to the invention. It is also known to employ low-frequency vibrations within the mould for multicomponent plastics in order to achieve a good, homogeneous bond (German Utility Model 7124435), but the solution attained by the invention is not achieved.

It is also known to move the plastic material to and fro in the mould in a similar manner to the method known as the scoring method (U.S. Pat. No. 5,556,582), but this does not solve the problem on which the invention is based. Owing to the natural inertia of the material and the relatively high pressures prevailing, it is not possible to use magnetically controlled injection valves to achieve the requisite frequency, even if such frequencies theoretically appear achievable with magnetic valves, as it is not guaranteed that these needle valves have actually opened. A type of cascade injection is formed, but no vibration of the plastic strands with the desired engagement of the molecules, etc. Whereas, for example, vibrations at 60 Hz can be achieved in the invention, even the attainment of a 1 Hz frequency may be problematic in the case of pneumatically/hydraulically or magnetically operated needle valves.

According to an advantageous embodiment of the process according to the invention, the frequency of the vibrations of the melt strands or the like facing one another is of approximately equal magnitude, but the respectively apportioned vibrations thereof are mutually offset. The offset must of course be such that the vibrations do not coincide with one another again, but instead the pulsing action described above is formed at the joint point, resulting in enmeshing of the flow line. If, for example, the melt flow is divided over two nozzles, this offset may depend on the distance by which the respective nozzle is separated from the joint point. In order to achieve enmeshing of the flow lines, the vibration may emanate from the melt, but it may also emanate from the injection mould, the nozzle and/or the mould core.

According to an additional embodiment of the invention, the amplitudes of the vibrations of the facing melt strands or the like are the same. The result of this is that the offset of vibration valleys and peaks remains the same during processing.

According to an additional embodiment of the invention, only one of the melt strands or the like facing one another is set in vibration, and consequently the enmeshing of the flow line takes place owing to the resultant vibration differences.

According to an additional embodiment of the invention, the materials consist of polymers, for example plastics.

According to an additional advantageous embodiment of the invention, the melt strands or the like are produced by injection moulding. In injection moulding in particular, the introduction of vibrations is effective for achieving the above-mentioned advantages.

According to an additional embodiment of the invention, the melt is injected into a moulding-determining mould intermittently and via at least two nozzles opening alternately.

According to an additional embodiment of the invention in this respect, the injection nozzles can be closed or opened in a controlled manner, with the opening times being offset with respect to one another in relation to the time of contact of the melt strands.

According to an additional embodiment of the invention, the opening duration and/or the frequency thereof can be changed in a controlled manner. This adjustment of opening duration or frequency depends primarily on the melt material and on the processing temperature.

A further additional embodiment of the invention is directed to the use of the process for pigmented melts and/or melts comprising filler mouldings. Thus, for example, a process has been disclosed (DE-A 197 10 610) in which plastics of this type are processed by injection moulding, with the starting materials being mixed intensively with one another before the melting. These starting materials are on the one hand pigments or fillers, for example platelet- or needle-shaped pigments, glass fibres or the like, and on the other hand a polymer, usually in the form of granules, these substances being mixed mechanically with one another before they are melted or processed, for example in the injection-moulding machine. In particular in the case of pigments or fillers having a large aspect ratio between the length, width and thickness, such as, for example, platelets, there is a risk of disturbed or unfavourable alignment in the region of the flow line, with the consequence that the flow line stands out visually. Owing to the process according to the invention, alignment of the pigments and fillers in the direction as in the remainder of the moulding is effected automatically in the region of the flow line, and consequently no change in alignment is evident after processing of the melt.

According to an advantageous embodiment of sub-claim 11, the synchronisation takes place mechanically. On the other hand, it could also take place electrically or with other auxiliary means with which the vibration or pulsing of the melt can be effected. Thus, control of the valve needles, for example via cam plates, pump pressure and the like, is conceivable.

According to an additional embodiment of the invention, each of the valves works with a rotary slide, which causes opening and/or closing depending on the rotary position. Needle closing nozzles (German patent 3910025) are known in which the valve needle opens against spring force.

According to an additional embodiment of the invention in this respect, the individual rotary slides of the valves are rotationally synchronised with one another.

According to an additional embodiment of the invention in this respect, the rotary synchronisation takes place via a gear mechanism which engages onto the rotary slides.

According to an additional embodiment of the invention, the rotary slides are driven in a rotating manner via a motor.

According to an additional embodiment of the invention, inclined grooves which interact with drilled holes in the valve casing for melt transport are arranged on the rotary slides for control of the melt strand.

According to an additional embodiment of the invention, the opening times of at least two valves are offset with respect to one another.

Further advantages and advantageous embodiments of the invention are revealed by the following description, the drawing and the claims.

DRAWING

Figure 2:
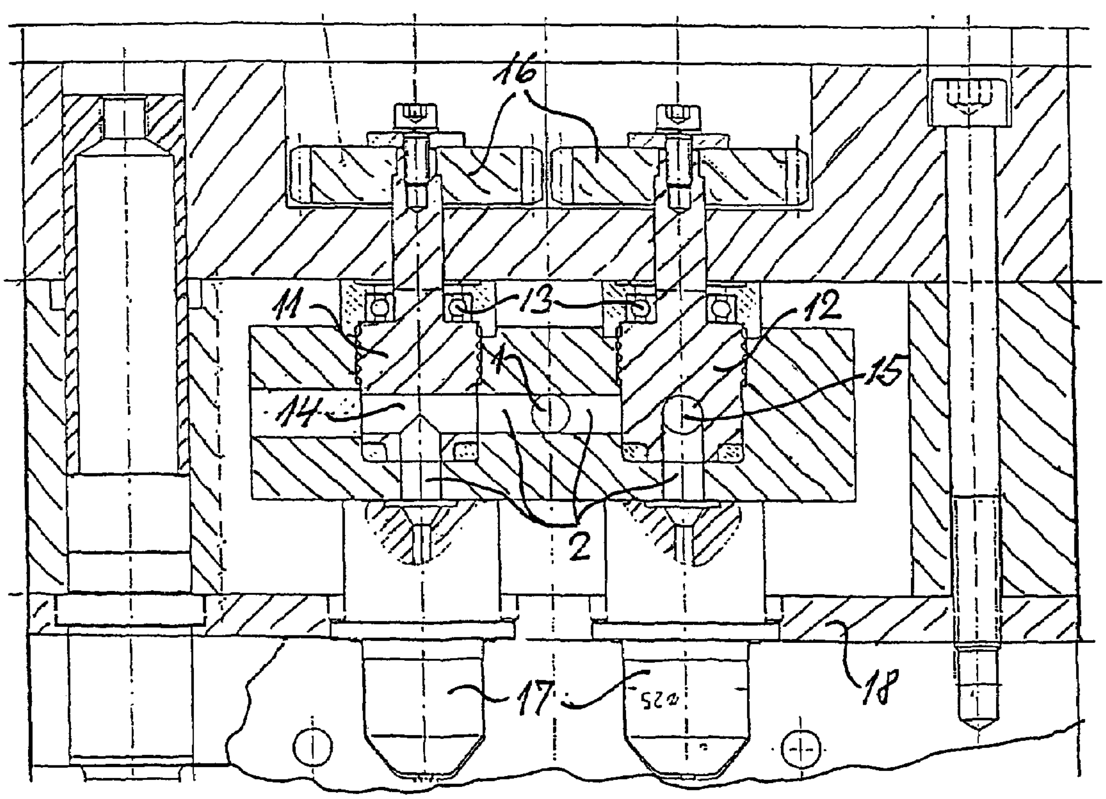

Two illustrative embodiments of the subject-matter of the invention are described in greater detail below and are shown in the drawing, in which:

FIG. 1 shows a highly simplified view of the first illustrative embodiment with inclined edge control, and FIG. 2 shows a longitudinal section through the second illustrative embodiment with two rotary slides.

DESCRIPTION OF THE ILLUSTRATIVE EMBODIMENT

As indicated in a highly simplified manner in FIG. 1, plastic melt is transported in an injection-moulding machine close to the injection mould (not shown) via a pressure channel 1 into a runner 2, which is controlled by two valve needles 3 and 4. This runner 2 leads to injection nozzles (not shown), which open into the injection mould. The pre-pressure of the plastic melt in the pressure channel 1 is formed by means (likewise not shown), for example a screw downstream of the melting zone of the machine. The valve needles 3 and 4 are driven in the same direction and at the same speed by gear wheels 5 and 6, for which purpose serves an intermediate gear wheel 7, whose shaft 8 is driven via a motor (not shown). Inclined annular grooves 9 and 10, via which the runner 2 is controlled directly, are arranged on the outer surfaces of the valve needles 3 and 4. The coordination of the inclined annular grooves 9 and 10 is selected in such a way that when one of the inclined annular grooves blocks the runner 2, the other always just effects opening thereof. In the position shown, the valve needle 3 with inclined annular groove 9 is just blocking the runner 2, while the valve needle 4 with inclined annular groove 10 is effecting opening thereof. As a consequence of the design, there is a transition region for the opening and closing. Since the nozzles (not shown) open into the same mould and the melt strands are constantly interrupted and opened again by the valve needles, the melt strands experience pulsed transport, with the pulses for the two strands alternating, so that a pulsed or vibrating cooperation and opposition of the melt strands takes place inside the mould and when the melt strands meet, causing penetration and bonding of the flow lines, which always form when melt streams come into contact with one another.

In the second illustrative embodiment shown in FIG. 2, provision is again made for two valves which control the runner 2, but with the aid of rotary slides 11 and 12. These rotary slides are additionally mounted on roller bearings 13 and have T-shaped control channels 14 and 15, which have their entrances radially, but the exit axially. These rotary slides 11 and 12 are driven by gear wheels 16 in such a way that when one rotary slide 11 or 12 closes its valve, the other rotary slide 12 or 13 always just opens. In the position shown, the control channel 14 is just open and the control channel 15, rotated by 90° with respect to the former, is closed. The two ends of the runner 2 terminate in injection nozzles 17, which tie are arranged on a platen 18 and via which the melt flow of the plastic melt is correspondingly transported alternately into the injection mould. The characteristics of the pulses or vibrations of the melt strands are determined firstly by the nature of the control channels 14 and 15 and secondly by the pre-pressure in the pressure channel 1, the nature of the plastic and, not least, the frequency-determining speed of the rotary slides 11, 12.

All features portrayed in the description, the following claims and the drawing may be essential to the invention both individually and in any desired combination with one another.

What is claimed is:

1. A process for the processing of a meltable material, in order to produce a molding, comprising forming flow lines with strands of the melt, vibrating or pulsing the melt strands, at least in sections, causing the melts to penetrate in a region of the flow lines owing to vibration differences, and bonding the flow lines to one another at a joint point of the melt strands.

2. A process according to claim 1, wherein the frequency of the vibration of the melt strands facing one another is of approximately equal magnitude, but the respectively apportioned vibrations thereof are mutually offset in time.

3. A process according to claim 1, wherein the amplitudes of the vibrations are the same.

4. A process according to claim 1, wherein only one of the melt strands facing one another is set in vibration.

5. A process according to claim 1, wherein the materials consist of polymers.

6. A process according to claim 1, wherein the melt strands are produced by injection molding.

7. A process according to claim 6, wherein the melts are injected into a molding-determining mold intermittently and via nozzles which open alternately.

8. A process according to claim 7, wherein the injection nozzles can be closed or opened in a controlled manner and in that the opening times are offset with respect to one another at the time of contact of the melt strands.

9. A process according to claim 1, wherein the opening duration and/or the frequency thereof can be changed in a controlled manner.

10. A process according to claim 1, wherein the meltable melt is a pigmented melt and/or the meltable melt comprises filler particles, wherein the pigments and fillers have a significantly different length to width to thickness.

11. A process according to claim 1, wherein the vibration or pulsation is up to 60 hertz.

12. A process according to claim 1, wherein the meltable material is a thermoplastic.

13. A process comprising intermittently injecting vibrating molten strands into a mold.

14. A process according to claim 13, wherein the vibration is up to 60 hertz.

15. A process comprising setting at least a section of a melt strand in vibration to bond at a region of a flow line with another melt strand outside a mold.

* * * * *